(12) United States Patent
Nakfoor

(10) Patent No.: US 8,346,580 B2
(45) Date of Patent: *Jan. 1, 2013

(54) SYSTEM AND METHOD FOR MANAGING TRANSFER OF OWNERSHIP RIGHTS TO ACCESS TO A VENUE AND ALLOWING ACCESS TO THE VENUE TO PATRON WITH THE OWNERSHIP RIGHT

(75) Inventor: Brett A. Nakfoor, Carlsbad, CA (US)

(73) Assignee: Flash Seats, LLC, Livonia, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/918,231

(22) Filed: Aug. 13, 2004

(65) Prior Publication Data

US 2005/0021365 A1    Jan. 27, 2005

Related U.S. Application Data

(63) Continuation-in-part of application No. 10/320,287, filed on Dec. 16, 2002, now Pat. No. 8,131,572, which is a continuation of application No. 09/590,455, filed on Jun. 9, 2000, now Pat. No. 6,496,809.

(51) Int. Cl.
*G06Q 10/00*    (2012.01)

(52) U.S. Cl. .................... 705/5; 705/6; 705/37; 705/64; 705/80

(58) Field of Classification Search .................. 705/5, 6, 705/37, 64, 80; 235/380, 382
See application file for complete search history.

(56) References Cited

U.S. PATENT DOCUMENTS

| 3,622,995 | A | 11/1971 | Dilks et al. |
| 4,086,475 | A | 4/1978 | Churchill |
| 5,021,593 | A | 6/1991 | Nohira et al. |
| 5,124,535 | A | 6/1992 | Kocznar et al. |

(Continued)

FOREIGN PATENT DOCUMENTS

DE    2506673 A1    8/1976

(Continued)

OTHER PUBLICATIONS

John Henderson, That's the Internet Ticket, Aug. 1, 1999, Palm Beach Daly News.*

(Continued)

*Primary Examiner* — Naresh Vig
(74) *Attorney, Agent, or Firm* — Hamilton, Brook, Smith & Reynolds, P.C.

(57) ABSTRACT

Certain embodiments of a multi-input access device and method for using which allow access to an event or venue include a detector for detecting authentication data for a person and a processor for authenticating the authentication data to verify that the person is allowed to access the event. The authentication data includes at least paperless authentication data for the person. The authentication data may include a printed ticket, a magnetic strip, a bar code, a credit card, an identification card, a smart card, a radio frequency identifier, an electronic device, biometric data, a signal, and/or other authentication data. The access device may include an access gate, a turnstile, a handheld access device, a retrofit unit, and/or other access device. In an embodiment, the access device includes a verification module generating access verification data for the person.

18 Claims, 7 Drawing Sheets

U.S. PATENT DOCUMENTS

| | | | |
|---|---|---|---|
| 5,202,550 | A | 4/1993 | Kocznar et al. |
| 5,243,331 | A | 9/1993 | McCausland et al. |
| 5,382,781 | A | 1/1995 | Inoue |
| 5,459,306 | A | 10/1995 | Stein et al. |
| 5,478,995 | A | 12/1995 | Wallerstorfer et al. |
| 5,598,477 | A | 1/1997 | Berson |
| 5,724,520 | A | 3/1998 | Goheen |
| 5,754,654 | A | 5/1998 | Hiroya et al. |
| 5,794,207 | A | 8/1998 | Walker et al. |
| 5,797,127 | A | 8/1998 | Walker et al. |
| 5,835,087 | A | 11/1998 | Herz et al. |
| 5,866,889 | A | 2/1999 | Weiss et al. |
| 5,894,277 | A | 4/1999 | Keskin et al. |
| 5,897,620 | A | 4/1999 | Walker et al. |
| 5,930,761 | A | 7/1999 | O'Toole |
| 5,940,835 | A | 8/1999 | Sit |
| 5,948,040 | A | 9/1999 | DeLorme et al. |
| 5,949,875 | A | 9/1999 | Walker et al. |
| 5,974,396 | A | 10/1999 | Anderson et al. |
| 6,023,685 | A | 2/2000 | Brett et al. |
| 6,055,513 | A | 4/2000 | Katz et al. |
| 6,067,532 | A | 5/2000 | Gebb |
| 6,085,976 | A | 7/2000 | Sehr |
| 6,107,932 | A | 8/2000 | Walker et al. |
| 6,119,096 | A | 9/2000 | Mann et al. |
| 6,119,945 | A | 9/2000 | Muller et al. |
| 6,173,209 | B1 | 1/2001 | Laval et al. |
| 6,175,922 | B1 | 1/2001 | Wang |
| 6,192,349 | B1 | 2/2001 | Husemann et al. |
| 6,216,227 | B1 | 4/2001 | Goldstein et al. |
| 6,223,166 | B1 | 4/2001 | Kay |
| 6,240,396 | B1 | 5/2001 | Walker et al. |
| 6,266,651 | B1 | 7/2001 | Woolston |
| 6,308,159 | B1 | 10/2001 | Strohl |
| 6,360,254 | B1 | 3/2002 | Linden et al. |
| 6,360,953 | B1 | 3/2002 | Lin et al. |
| 6,363,351 | B1 | 3/2002 | Moro |
| 6,470,451 | B1 | 10/2002 | Weinstein |
| 6,523,116 | B1 | 2/2003 | Berman |
| 6,617,960 | B1 | 9/2003 | Fischer et al. |
| 6,738,750 | B2 | 5/2004 | Stone et al. |
| 6,779,721 | B2 * | 8/2004 | Larson et al. ............ 235/382 |
| 6,842,741 | B1 | 1/2005 | Fujimura |
| 6,871,186 | B1 | 3/2005 | Tuzhilin et al. |
| 6,889,098 | B1 | 5/2005 | Laval et al. |
| 6,920,431 | B2 | 7/2005 | Showghi et al. |
| 6,999,936 | B2 | 2/2006 | Sehr |
| 7,093,130 | B1 | 8/2006 | Kobayashi et al. |
| 7,280,975 | B1 | 10/2007 | Donner |
| 7,308,426 | B1 | 12/2007 | Pitroda |
| 8,131,572 | B2 | 3/2012 | Nakfoor |
| 2001/0018660 | A1 | 8/2001 | Sehr |
| 2002/0023955 | A1 | 2/2002 | Frank et al. |
| 2002/0034978 | A1 | 3/2002 | Legge et al. |
| 2002/0085762 | A1 | 7/2002 | Shniberg et al. |
| 2002/0138357 | A1 | 9/2002 | Dutta |
| 2002/0138751 | A1 * | 9/2002 | Dutta ............ 713/200 |
| 2003/0024988 | A1 | 2/2003 | Stanard |
| 2003/0153288 | A1 | 8/2003 | Nakatsuyama |
| 2003/0171960 | A1 * | 9/2003 | Skinner ............ 705/5 |
| 2003/0234287 | A1 | 12/2003 | Stockhammer et al. |
| 2004/0006497 | A1 * | 1/2004 | Nestor et al. ............ 705/5 |
| 2004/0049412 | A1 | 3/2004 | Johnson |
| 2004/0073439 | A1 * | 4/2004 | Shuster ............ 705/1 |
| 2004/0093302 | A1 | 5/2004 | Baker et al. |
| 2004/0093309 | A1 * | 5/2004 | Nakamura et al. ............ 705/65 |
| 2004/0199438 | A1 | 10/2004 | Rowe |
| 2004/0248554 | A1 | 12/2004 | Khan et al. |

FOREIGN PATENT DOCUMENTS

| | | |
|---|---|---|
| DE | 10209015 A1 | 9/2003 |
| EP | 0 428 233 A1 | 5/1991 |
| JP | 2001-014409 A | 1/2001 |
| JP | 2001-338098 | 12/2001 |
| JP | 2002-007827 | 1/2002 |
| JP | 2002-024424 | 1/2002 |
| JP | 2002-056140 A | 2/2002 |
| JP | 2002-109343 | 4/2002 |
| JP | 2002-183612 A | 6/2002 |
| JP | 2002-298173 A | 10/2002 |
| JP | 2002-312813 A | 10/2002 |
| JP | 2003-323642 A | 11/2003 |
| JP | 2004-030063 | 1/2004 |
| WO | WO 96/34357 | 10/1996 |
| WO | WO 98/10361 | 3/1998 |
| WO | WO 99/06928 | 2/1999 |
| WO | WO 99/60489 | 11/1999 |
| WO | WO 99/60489 A1 | 11/1999 |
| WO | WO 01/52139 A1 | 7/2001 |
| WO | WO 01/54036 A1 | 7/2001 |
| WO | WO 02/33612 A1 | 4/2002 |

OTHER PUBLICATIONS

TicketMaster Website, 1999-2000.

Business Wire, Acteva and Enspot.com sign agreement to provide online ticketing, broader distribution, p. 1248, Dialog file 621, Access No. 02248591, Dec. 1999.

Business Week, "Will ticketmaster get scalped? The justice dept. and rivals question its dominance," Dialog File 624, Access No. 0672094, Jan. 1995.

Business Wire, "Tickets.corn Announces Record First quarter revenues, ten-fold expansion in Internet business . . . ", p0083, Dialog File 621, Access No. 02500747, May 2000.

Anonymous, "Online Movie Ticket Site Launched in China," China Online, Dialog File 20: Dialog Global Reporter, Dec. 23, 1999.

Anonymous, "Biometric Recognition is a Match Winner", Automatic ID News Europe, vol. 6, No. 7, Sep. 1997.

Anonymous, "Acteva and Enspot.Com Sign Agreement to Provide On-Line Ticketing, Broader Distribution", Business Wire, Dec. 3, 1999.

Anonymous, "Keyware Unveils Multi-Application Smart Card Suite", Card News, vol. 16, Issue 10, May 30, 2001.

Home page For: eventlink (www.eventpass.com): Sep. 8, 2000.

International Search Report for PCT/US05/28814, Feb. 23, 2006, Nakfoor, Brett A.

Henderson, J., "That's the (Internet) Ticket", *Palm Beach Daily News*, 103(264), 2 pages (Aug. 1-4, 1999).

Brochu, N.S., "A New Kind of Card Game", *Sun-Sentinel*, South Florida, 2 pages (Aug. 2, 1999).

"Ticketing System Uses Internet Technology to Reduce Unused Seats While Combating Scalpers and Brokers", *Marketing Report*, 11(11), 2 pages (Aug. 1999).

"Paperless Ticketing for Sports Events in 1999: Getting into the Game." News piece as aired on Channel 12 News [online], posted on Oct. 19, 2008 [retrieved on Dec. 15, 2008]. Retrieved from the Internet URL: http://www.youtube.com/watch?v=KjEm1nd3U58.

"VeriSeats™: The Invention of Paperless Ticketing for Use at Entertainment and Sports Events" [online], 2008 [retrieved on Dec. 16, 2008]. Retrieved from the Internet URL: http://veriseats.com.

Office Action of U.S. Appl. No. 10/320,287, mailed on Jun. 15, 2009.

Tankersley, J., "Basketball Ticket Plan Unveiled," The Stanford Daily, An Independent Newspaper, 216(18), (Oct. 13, 1999).

"Tickets.com Announces Record First Quarter Revenues; Ten-Fold Expansion in Internet Business . . . " Business Wire, (May 15, 2000).

"Tickets.com", Prospectus Summary, Nov. 3, 1999.

TicketMaster Website, [online] [Retrieved on Aug. 24, 2000] Retrieved from the Internet URL: https://ticketing.ticketmaster.com/cgi/p...nt_idF003076E064E7&event_code=EEQ0825.

Tjøstheim, I., et al., "A case study of an on-line auction for the World Wide Web," [online] [Retrieved on Aug. 20, 2008], Retrieved from the Internet URL: http://www.nr.no/~ingvar/enter98.html.

Wigand, R. T., "Electronic Commerce: Definition, Theory, and Context," *The Information Society*, 13: 1-16 (1997).

Wigand, R. T., et al., "Electronic Commerce: Effects on Electronic Markets," *J. of Computer-Mediated Communication*, 1(3), Retrieved from the Internet URL: http://jcmc.indiana.edu/vol1/issue3/wigand.html. [Retrieved Feb. 27, 2008].

"University of Texas—General Information 1996-1997, Registration, Fees, Deposits," pp. 1-8, [Retrieved on Feb. 20, 2008], Retrieved from the Internet URL: http://www.utexas.edu/student/registrar/catalogs/gen-info/fees5.html.

Zwass, V., "Electronic Commerce: Structures and Issues," *Intl. J. of Electronic Commerce*, 1(1): 3-23 (1996, Fall).
"Online Movie Ticket Site Launched in China." WCON, (Dec. 23, 1999).
"Biometric Recognition is a Match Winner." News Europe, 6(7), (Sep. 15, 1997).
"Keyware Unveils Multi-Application Smart Card Suite." Card News, 16(10), May 30, 2001.
Home Page For Eventlink (www.eventpass.com) [online] [Retrieved on Sep. 8, 2000] Retrieved from the internet URL: http://www.eventpass.com/.
Memorandum, "The Just@rrive Men's Basketball Solution," Just@rrive, Inc., (Aug. 2, 1999).
"Justarrive Business Proposal and Demonstration," Justarrive, Inc., Stanford University (Oct. 11, 1999).
Brochure, Justarrive, Inc. Aug. 1999.
Brochure, "Justarrive & Stanford Athletics—A Powerful Combination," Justarrive, Inc., pp. 1-4.
Justarrive, Inc., "The Justarrived Platform: Integrated Entrance," Dated, May 21, 2008.
Justarrive, Inc., "Hardware," Dated, May 21, 2008.
"Justarrive Redefines College Sports Marketing Rewarding Both Fans and Teams Alike," *Business Wire*, Nov. 10, 2000.
Bases Job Postings Apr. 17, 2000, The Source for Start-up Jobs, Published Weekly, http://bases.stanford.edu/job_postings_db/, Justarrive, Inc.
Flash Seats Complaint to Paciolan, Inc., United States District Court for the District of Delaware, pp. 1-4.
Paciolan's Answer and Counterclaims, *Flash Seats LLC v. Paciolan, Inc.*, United States District Court for the District of Delaware, Civil Action No. 07-575 (JJF), pp. 1-8.
Flash Seats' Reply to Counterclaims of Paciolan, United States District Court for the District of Delaware, Civil Action No. 07-575 (JJF), pp. 1-4.
Plaintiff Flash Seats, LLC's Opening *Markman* Brief, United States District Court for the District of Delaware, Civil Action No. 07-575 (JJF), pp. 1-33.
Declaration of Maria L. Cedroni, Esq., in Support of Plaintiff Flash Seats, LLC's Opening *Markman* Brief, including Exhibits A-O, United States District Court for the District of Delaware, Civil Action No. 07-575 (JJF).
Declaration of Steven R. Kursh, Ph.D., CSDP, in Support of Plaintiff Flash Seats, LLC's Opening *Markman* Brief, including Exhibits 1-4, United States District Court for the District of Delaware, Civil Action No. 07-575 (JJF).
Paciolan's Opening Claim Construction Brief, United States District Court for the District of Delaware, Civil Action No. 07-575 (JJF), Jun. 2008.
Declaration of Benjamin B. Au in Support of Paciolan's Brief on Claim Construction, including Exhibits A-Y, United States District Court for the District of Delaware, Civil Action No. 07-575 (JJF).
Flash Seats, LLC's Answer to Paciolan's Opening Claim Construction Brief, United States District Court for the District of Delaware, Civil Action No. 07-575 (JJF), Jul. 2008.
Declaration of Steven R. Kursh, Ph.D., CSDP in Support of Flash Seats, LLC's Answer to Paciolan's Opening Claim Construction Brief, including Exhibits 5-8, United States District Court for the District of Delaware, Civil Action No. 07-575 (JJF).
Paciolan, Inc.'s, Answering Claim Construction Brief, United States District Court for the District of Delaware, Civil Action No. 07-575 (JJF), Jul. 2008.
Declaration of Benjamin B. Au in Support of Paciolan Inc.'s Reply to Flash Seats, LLC's Claim Construction Brief, United States District Court for the District of Delaware, Civil Action No. 07-575 (JJF).
Declaration of Vernon Thomas Rhyne, Ph.D. P.E., R.P.A., in Support of Paciolan's Answering Claim Construction Brief, United States District Court for the District of Delaware, Civil Action No. 07-575 (JJF), pp. 1-14.
Letter to District Court forwarding Supplemental Declaration of Benjamin D. Au, including Exhibit A, United States District Court for the District of Delaware, Civil Action No. 07-575 (JJF), Jul. 2008.
Declaration of Maria L. Cedroni, Esq. In Support of Supplemental Submission for Markman Hearing, United States District Court for the District of Delaware, Civil Action No. 07-575 (JJF), forwarded to District Court in letter dated Jul. 30, 2008.
Transcript of Markman Hearing Before the Honorable Joseph J. Farnan United States District Judge, United States District Court for the District of Delaware, Civil Action No. 07-575 (JJF), Jul. 22, 2008.
Second Stipulated Order Staying Case (*Flash Seats, LLC v. Paciolan, Inc.*) United States District Court for the District of Delaware, Civil Action No. 07-575 (JJF).
Declaration of Maria L. Cedroni, Esq. In Support of Plaintiff Flash Seats, LLC's Answering Brief, including Exhibits P-R, United States District Court for the District of Delaware, Civil Action No. 07-575 (JJF), Jul. 11, 2008.
Extended European Search Report for EP Application No. 05785543.9-2211, date of mailing Jul. 7, 2010.
Final Office Action for U.S. Appl. No. 10/320,287, date of mailing Sep. 7, 2011.
Kotler, Philip, Marketing Management: Analysis, Planning, Implementation, and Control, Ninth Edition, Prentice-Hall, Inc., A Simon & Schuster Company, Upper Saddle River, New Jersey, pp. 498-499 and 513, 1997.
Collection of News Article Reports (1999).
American Airlines, "Rules for American Airlines' Silent Auction", (on or before Oct. 16, 1996).
American Airlines, "Latest American Airlines Internet Silent Auction Says, Bring Along Your Friends" Released: Aug. 8, 1996.
American Airlines, "Internet Silent Auction, Items for Silent Auction.", (on or before Aug. 5, 1996).
American Airlines, "Internet Silent Auction Room, Two Coach Class Roundtrip Tickets to one of Nine Selected Destinations", (on or before Aug. 5, 1995).
"Acteva and Enspot.com sign agreement to provide on-line ticketing, broader distribution" Business Wire. Dec. 2, 1999.
Alba, J., et al., "Interactive Home Shopping: Consumer, Retailer, and Manufacturer Incentives to Participate in Electronic Marketplaces," *J. of Marketing*, 61: 38-53 (Jul. 1997).
Armstrong, A., et al., "The Real Value of On-Line Communities," *Harvard Business Review*, pp. 134-141 (May-Jun. 1996).
Asokan, N. et al., "Secure Electronic MarketPlace for Europe, SEMPER" IBM Research, Zurich, (1999).
Cox, B., "Lufthansa Launches Air Fare Auction Promo," [online], Feb. 23, 1999 [Retrieved on Feb. 20, 2008, Retrieved from the Internet URL: http://www.internetnews.com/ec-news/article.php/72061.
Deighton, J., "The Future of Interactive Marketing," *Harvard Business Review*, pp. 4-16 (Nov.-Dec. 1996).
"EBay," Wikipedia, [online] [Retrieved on Oct. 23, 2008], Retrieved from the Internet URL: http://en.wikipedia.org/wili/Ebay.
"Egghead.com/OnSale.com—About Us." [online] [Retrieved on Oct. 7, 2008], Retrieved from the Internet URL: http://web.archive.org/web/19991129022730/www.onsale.com/helpinfo.firsttime/about.h . . . .
Foster, C., "It's All in the Cards: Four student entrepreneurs have built a better season ticket," *Stanford Magazine: Bright Ideas*, May/Jun. 2000, [online], [Retrieved on May 20, 2008], Retrieved from the Internet URL: http://www.stanfordalumni.org/news/magazine/2000/mayjun/departments/brightideas.html.
Fujimura, K., et al., "Digital-Ticket-Controlled Digital Ticket Circulation," *Proceeding of the 8th USENIX Security Symposium*, Aug. 23-26, 1999.
Garcia, D. L., "Networked Commerce: Public Policy Issues in a Deregulated Communication Environment," *The Information Society*, 13: 17-31 (1997).
Gogan, J. L., "The Web's Impact on Selling Techniques: Historical Perspective and Early Observations," *Intl. J. of Electronic Commerce*, 1(2): 89-108 (1996-1997, Winter).
Harvard University Dining Services—Crimson Cash, [online] [Retrieved on Feb. 20, 2000] Retrieved from the Internet URL: http://web.archive.org/web/19990424112706/www.dining.harvard.edu/crimson_cash.html.
Henderson, J., "That's the (Internet) ticket, Ex-Prosecutors Develop Electronic Turnstile System," Palm Beach Daily News, 103(264): 22, (Aug. 1, 1999).

Himelstein, L., "Will Ticketmaster get scalped?: The justice dept. and rivals question its dominance." Business Week, No. 3430: 64+, (Jun. 26, 1995).

Hoffman, D. L., et al., "Commercial Scenarios for the Web: Opportunities and Challenges," Retrieved from the Internet URL: http://jcmc.indiana.edu/vol1/issue3/hoffman.html. [Retrieved on Feb. 27, 2008].

Hoffman, D. L., et al., "Marketing in Hypermedia Computer-Mediated Environments: Conceptual Foundations," *J. of Marketing*, 60: 50-68 (Jul. 1996).

Jarvenpaa, S. L., et al., "Consumer Reactions to Electronic Shopping on the World Wide Web," *Intl. J. of Electronic Commerce*, 1(2): 59-88 (1996-1997, Winter).

Kaliniak, C., "Spring Technologies and Jhoon Rhee Tae Kwon Do Launch New Technology that Enhances Customer Service," [online], [Retrieved on Feb. 20, 2008], Retrieved from the Internet URL: http://web.archive.org/web/20010210040224/wvvw.eyeticket.com/company/press-room . . . (Apr. 1999).

Kaliniak, C., "SportScan Provides High Tech Solution to Enhancing Jhoon Rhee Tae Kwon Do Customer Experience," [online], Jun. 1999 [Retrieved on Feb. 20, 2008], Retrieved from the Internet URL: http://web.archive.org/web/20010415014244/wvvw.eyeticket.com/company/press-room . . . .

Kopf, J.H., "Product Design, Justarrive Entrance Unit v.3—Electronic Fulfillment System.", (Jan. 2001-Dec. 2001).

Lee, H. G., et al., "Impacts of the Electronic Marketplace on Transaction Cost and Market Structure," *Intl. J. of Electronic Commerce*, 1(1): 127-149 (1996, Fall).

Lucking-Reiley, D., "Auctions on the Internet: What's Being Auctioned, and How?" Department of Economics, Vanderbilt University, Aug. 14, 1999.

Lufthansa USA: Welcome to Lufthansa, [online], [Retrieved on Feb. 21, 2008], Retrieved from the Internet URL: http://web.archive.org/web/19990222101713/http://www.lufthansa-usa.com/.

Martin, D., "No Tickets Required," *Travel Agent*, 275(6): 28+, (May 8, 1995)

Matsuyama, K., et al., "Distributed Digital-Ticket Management for Rights Trading System", Association for Computing Machinery, Proceedings of the $1^{st}$ ACM Conference on Electronic Commerce, E-COMMERCE 99, 110-118, (1999).

Moran, S., "Going . . . Going . . . Downloaded," *Information Processing*, (on or after Sep. 5, 1997).

Neo, B. S., "The Implementation of an Electronic Market for Pig Trading in Singapore," *J. of Strategic Information Systems*, 1(5): 278-288 (Dec. 1992).

Quelch, J. A., et al., "The Internet and International Marketing," *Sloan Management Review*, pp. 60-75 (1996, Spring).

Reck, M., "Types of Electronic Auctions," *Information and Communications Technologies in Tourism*, Proceedings of the Intl. Conf. in Innsbruck, Austria (1994).

San Diego State University, Graduate Bulletin 1996-1997, pp. 1-11, [online] [Retrieved on May 20, 2000] Retrieved from the Internet URL: http://web.archive.org/web/20000609-19960101re_/http://coursecat.sdsu.edu/GB9697/SF . . . .

* cited by examiner

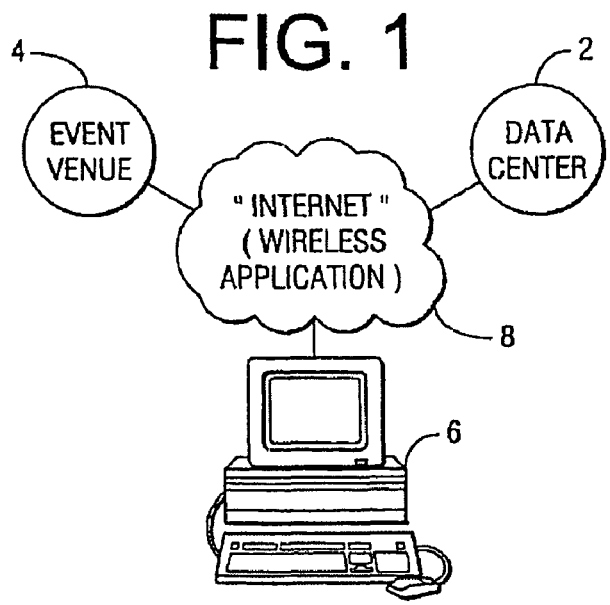
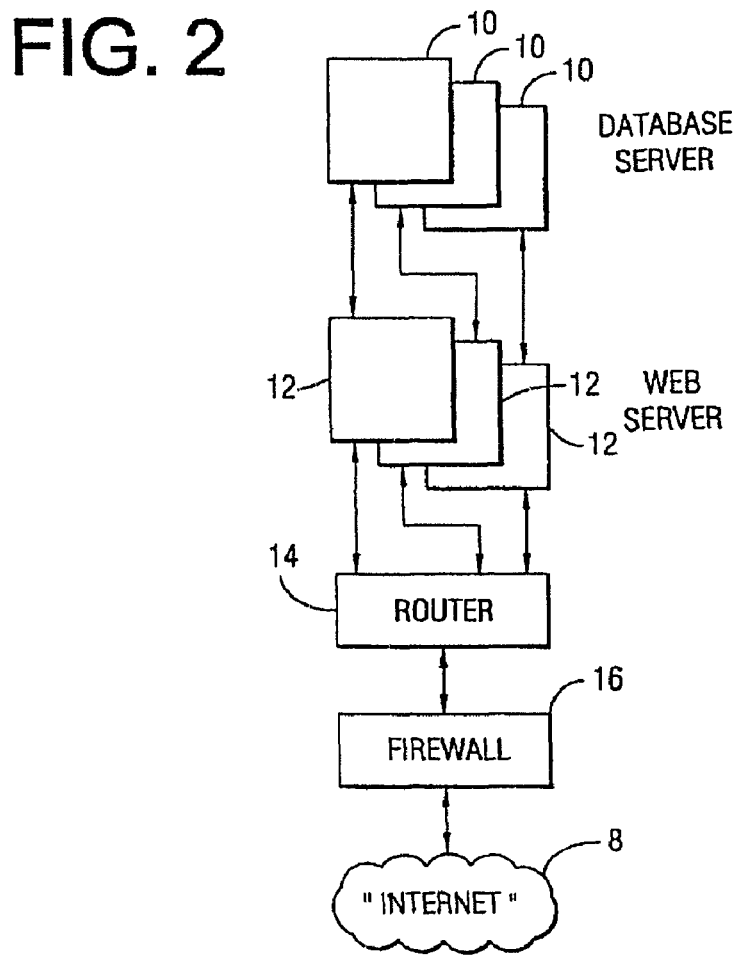

SYSTEM AND METHOD FOR MANAGING TRANSFER OF OWNERSHIP RIGHTS TO ACCESS TO A VENUE AND ALLOWING ACCESS TO THE VENUE TO PATRON WITH THE OWNERSHIP RIGHT

RELATED APPLICATIONS

The present application is a continuation-in-part, and claims priority from U.S. Patent Application No. 10/320,287 filed on Dec. 16, 2002, now U.S. Pat. No. 8,131,572 and entitiled "Electronic Ticketing System and Method", which is a Continuation of application Ser. No. 09/590,455 now U.S. Pat. No. 6,496,809,filed on Jun. 9, 2000.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

The present invention generally relates to a system and method for real-time sales and distribution of tickets.

Paper tickets are widely used to grant access to patrons to sporting and general entertainment events. The ticket is a contract which grants the holder the right to attend the event and, normally, to sit in a particular seat. By transferring possession of the physical ticket, a ticket holder has transferred the right to attend the event.

However, many problems are associated with the transfer of paper tickets. In order to issue the ticket, the event promoter must organize the delivery of thousands of tickets. Additionally, if a purchaser wishes to transfer the ticket to a subsequent purchaser, the buyer and seller must be geographically proximate to physically transfer the ticket. With the advent of the Internet, buyers and seller have been able to locate each other in order to transfer tickets. However, the paper ticket still stands as an impediment to the efficient transfer of the right to attend an event because the seller must ship the ticket to the seller. By shipping the ticket the buyer and seller incur additional costs and require a greater lead time to allow the transfer to occur before the event. Each party must also have enough trust that the other party will deliver as agreed. Frequently, because of the impediments of sale, tickets are not widely transferred by geographically remote buyers and sellers. Additionally, there is a need for a system to assist in a transition away from paper tickets.

Another type of impediment stands in the way of the efficient transfer of tickets. Most states have laws which prevent the sale of tickets for more than the face value of the ticket unless the seller has the consent of the event sponsor. To sell the ticket above face value, it is impractical for an individual seller to attempt to obtain permission from an event sponsor prior to selling a ticket. Because an event sponsor makes no money on the transaction, it has very little incentive to grant consent.

In a few other states laws allow a ticket broker to sell tickets at a price above the face value of the ticket, but not buy tickets above face value. Therefore, ticket brokers must obtain a ticket at the face value from the event sponsor and resell the ticket at a higher price. The ticket broker is violating the law if he purchases the ticket at a higher value from someone who is not a ticket broker. Finally, the ticker broker must still physically transfer the ticket to the buyer.

The present invention is a system and method which provides a legal, efficient way to transfer the right to attend an event at the market value of that right and to determine the market value. The present invention eliminates the disadvantages of the prior art.

BRIEF SUMMARY OF THE INVENTION

Certain embodiments of the present invention provide a method and system for access to an event or venue using at least one of a plurality of authentication data. Certain embodiments of an access system include authentication data identifying a patron having access to a venue and an access device allowing the patron access to the venue based on the authentication data. The authentication data comprises at least paperless data, and the access device verifies the patron's access to the venue based on the authentication data for the patron.

In an embodiment, the access device accepts a plurality of forms of the authentication data to allow access to the venue. The access device may include an access gate or a handheld access device, for example. In an embodiment, the authentication data is paper-based authentication data and/or paperless authentication data. In an embodiment, the access device grants access to the venue by verifying the authentication data with data at a database. The access device may also generate access verification for the patron.

In an embodiment, the system further includes a transfer event for access to the venue from an owner to the patron using patron ownership information. The authentication data may be based on the patron ownership information.

Certain embodiments of a method for accessing a venue using authentication data include obtaining access to a venue, associating paperless authentication data with authorization for a patron to access the venue, and authorizing access to the venue based on the paperless authentication data. In an embodiment, the authentication data includes printed authentication data and non-printed authentication data. Access may be authorized by verifying the authentication data with data at a database. Access may be authorized based on the authentication data using an access device capable of accepting multiple forms of paper and paperless authentication data. In an embodiment, the method further includes transmitting the authentication data to a processing system for verification of access by the patron. The method may also include generating access verification for the patron at the venue. Additionally, the method may include transmitting a right to access the venue from a prior owner to the patron.

Certain embodiments of a multi-input access device which allows access to an event include a detector for detecting authentication data for a person and a processor for authenticating the authentication data to verify that the person is allowed to access the event. The authentication data includes at least paperless authentication data for the person. The authentication data may include a printed ticket, a magnetic strip, a bar code, a credit card, an identification card, a smart card, a radio frequency identifier, a mobile access device, a wireless access device, a signal, an electronic device, biometric data, and/or other authentication data. The access device may include an access gate, a turnstile, a handheld access device, a retrofit unit, and/or other access device. In an embodiment, the access device includes a verification module generating access verification data for the person.

BRIEF DESCRIPTION OF SEVERAL VIEWS OF THE DRAWINGS

FIG. 1 is a diagram of the system according to an embodiment of the present invention.

FIG. 2 is a diagram of a data center according to an embodiment of the present invention.

Figure 3:
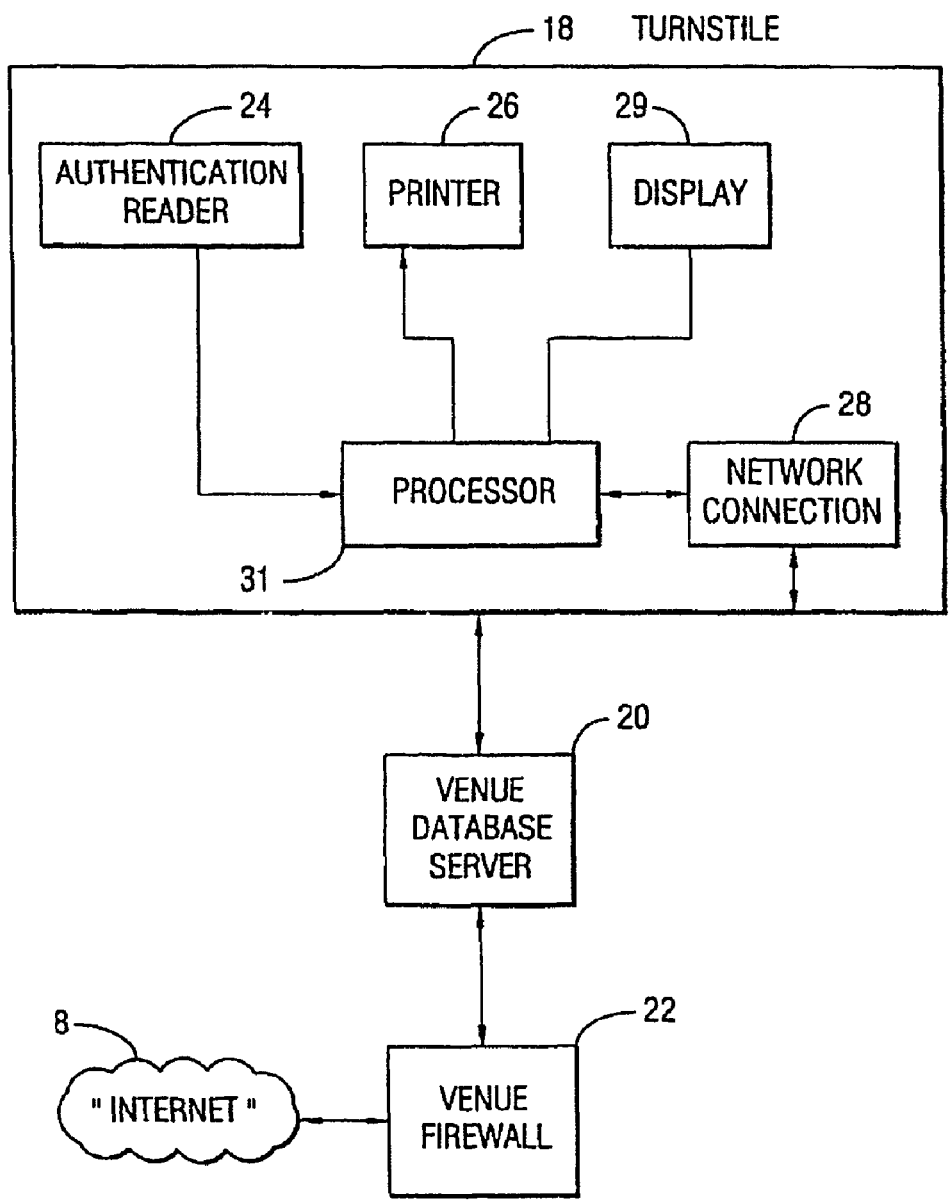
FIG. 3 is a diagram of a venue according to an embodiment of the present invention.

The foregoing summary, as well as the following detailed description of certain embodiments of the present invention, will be better understood when read in conjunction with the appended drawings. For the purpose of illustrating the invention, certain embodiments are shown in the drawings. It should be understood, however, that the present invention is not limited to the arrangements and instrumentality shown in the attached drawings.

DETAILED DESCRIPTION OF THE INVENTION

FIG. 1 illustrates an electronic ticketing system used in accordance with an embodiment of the present invention. The system includes a data center 2, a plurality of venues 4, and a plurality of terminals 6. The data center 2 is in communication with each venue 4 and each terminal 6 through the Internet or any Wireless Application 8. The terminals 6 can be any device through which a user can access a website, for example: a personal computer, a personal digital assistant, an Internet-through-television device, or any type of many available wireless devices available in the market.

Referring to FIG. 2, the data center 2 preferably comprises database servers 10, web servers 12, a load balancing router 14 and a firewall 16 connected to the Internet 8. The firewall 15 receives messages from the Internet 8 and forwards the messages to the load balancing router 14 and likewise receives messages from the load balancing router 14 and forwards them to the Internet 8. The firewall 16 preferably performs a number of filtering functions and network address translation in order to safeguard the data center 2 from unauthorized access. The firewall 16 also preferably encrypts the messages using known public key/private key encryption methods. The load balancing router 14 forwards messages received from the firewall 16 and forwards the messages to one of the plurality of web servers 12. The load balancing router 14 also forwards messages received from the web servers 12 to the firewall 16. In this manner, the load balancing router 14 distributes tasks to be performed to one of the plurality of web servers 12 in order to distribute processing demands. The web servers 12 access the database servers 10 to retrieve and store information in response to received messages from the terminals 6 and transmits reply messages to the terminals 6. The database servers 10 store data tables which contain information about various venues, events, ticket resources, user roles, ticket status, ticket holders and ticket bidders, as will be explained in greater detail below.

Referring to FIG. 3, within each venue 4 are a plurality of turnstiles 18, a venue database server 20 and a venue firewall 22 connected to the Internet 8 for communicating to the data center 2. The turnstile 18 of the venue 4 comprises an authentication reader 24, a printer 26, a network connection 28, a display 29 and a processor 31. The authentication reader 24 is preferably a magnetic card reader. However, other types of cards may be used, such as cards incorporating single- or multi-dimensional bar codes or wireless methods of communication, without departing from the scope of the present invention. The network connection 28 allows the turnstile 18 to communicate with the venue database server 20 in order to provide information about the card being scanned and to receive information about whether to grant or deny entry to the venue 4. The turnstile 18 preferably is a compact unit which runs from embedded software within the turnstile or from a server located on site or remotely 18. While the turnstile 18 is described as being connected to the venue database server 20 with a wire, one of ordinary skill in the art can easily recognize that communication between the turnstile and database server can be implemented by radio frequency, optical communication or any other method of wireless communication without departing from the scope of the present invention. The venue database server 20 maintains a record of the tickets that have been sold, the ticketholders that have passed through the turnstile 18, and which ticketholders have not yet arrived. The database server is preferably a computer running UNIX, Windows NT, Java or Sparc and having an Oracle, Informix, Sysbase or SQL Server database.

In order to implement the present invention, an end user can access the data center 2 by using a standard web browser on the terminal 6. However, non-standard, custom software can also be implemented or web browser software on a wireless device, such as a personal digital assistant. Terminals 6 can log into the data center 2 to view events which will take place in the future, purchase tickets in the primary market from the event sponsor, offer tickets for sale in the secondary market, purchase tickets in the secondary market and purchase merchandise or services related to the event. When the user has entered the appropriate address of a desired data center 2, e.g., an on-line ticketing web page, the user can view a calendar of events to search for a desired event or choose a venue to see what events will be appearing at the venue in the future. After selecting an event which the user desires to attend, the user may purchase tickets for the event from the event sponsor. Additional products and services can also be offered at the time of ticket sales. After the ticket is sold and before the time of the event, the ticket can be transferred by the ticket owner to subsequent ticket buyer.

Figure 4:
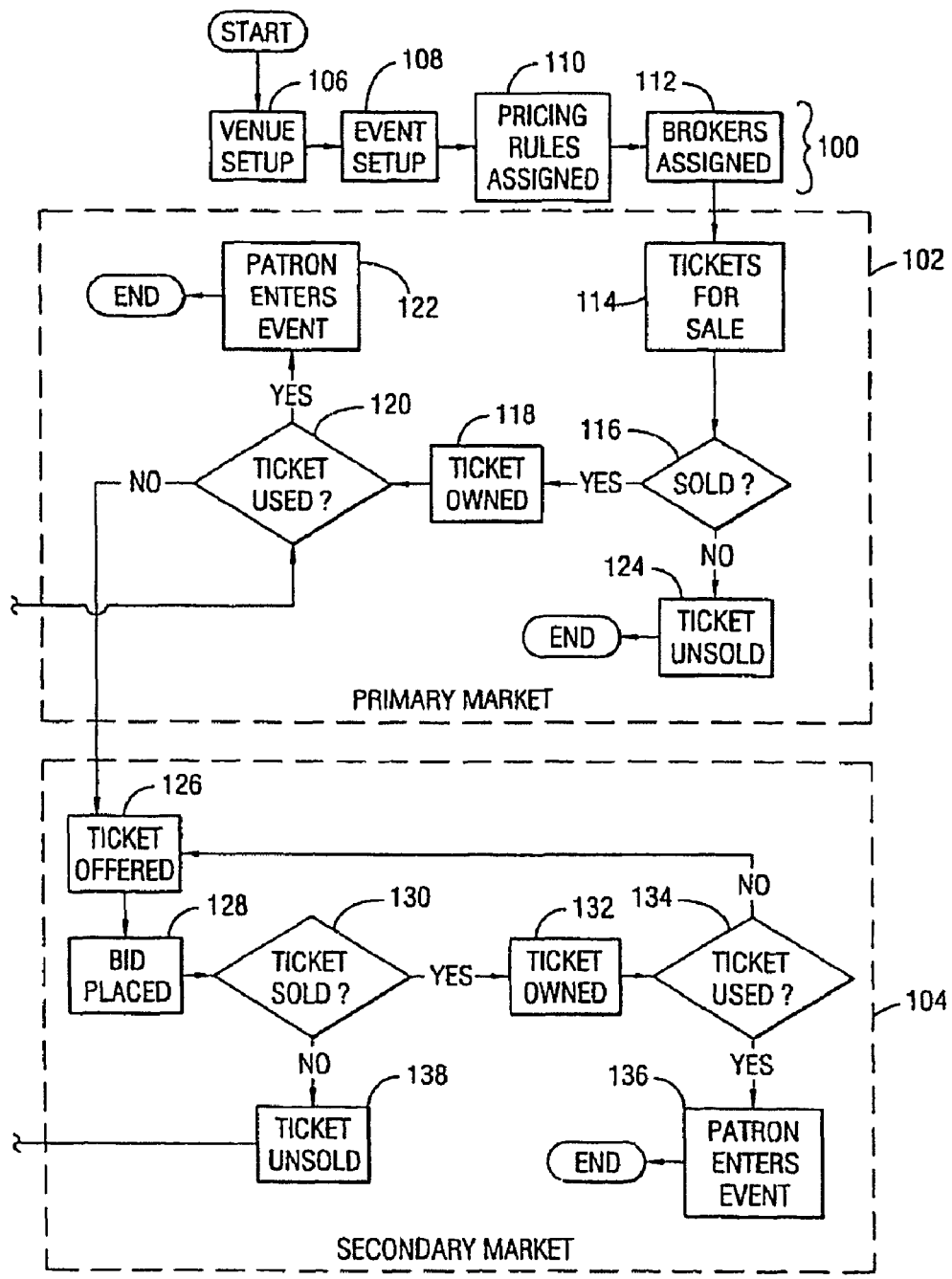
FIG. 4 is a flow chart describing the steps of an embodiment of the present invention.

Referring to FIG. 4, the ticket has a determined life cycle which is tracked by the system of the present invention. The steps of the life cycle are: ticket setup 100, primary market 102 and secondary market 104. In the ticket setup step, the ticket is assigned a venue 106 and an event 108. Also, ticket pricing rules 110 are associated with the ticket. Additionally, brokers may be assigned to the ticket 112 in order to transfer the ticket in a multi-broker environment. In the primary market step 114, the ticket is offered for sale. If the ticket is sold 116, the ticket becomes an "owned ticket" 118. If the ticket is used 120 by the person it is sold to, the patron is allowed to enter the event 122 and the ticket's life cycle ends in the primary market. If the ticket is not sold before the time of the event 124, the ticket's life cycle ends having been unsold in the primary market.

If the ticket is not used in the primary market, it may be traded in the secondary market 126. There is no limit as to how many times the ticket may be traded in the secondary market before the time of event. Many options are available for sales of tickets in the primary and secondary market. Sales of tickets can be made using traditional methods, such as by offering a ticket for a fixed price or a scaled price (i.e., student and senior citizen discounts). Tickets can also be offered using a non-traditional format, such as in an auction-type format, a reverse auction-type format or in an exchange-type format. In an auction-type format, event sponsors can place groups of tickets on sale and sell them to the highest bidder after a fixed period of time. Many different options are available for the auction-type format, such as allowing users to place bids for groups of tickets. If the user's bid cannot be satisfied at the present price for all seats, the bid fails. Alternatively, users can place a bid for which, if the bid cannot be fulfilled for the quantity of seats of the bid, the number of seats in the bid is reduced. Using the auction type format, the event sponsor realizes the maximum profit for the event because tickets are sold for their true market value. A reverse auction type format is similar to an auction-type format with the caveat that the event sponsor "bids" to sell the ticket rather than users bidding for the right to buy the ticket.

In an exchange type format, tickets are sold in the primary market by event sponsors who advertise an ask price for a particular ticket. At the same time, users advertise a bid price in order to purchase a particular ticket in a particular section of the venue. Both the ask price and the bid price remain valid for a particular period of time. If the ask price advertised by event sponsors is higher than the bid price advertised by any particular user, no ticket is sold. However, the moment a bid price equals an ask price, a sale of a ticket is made. Additionally, bids can specify quantities of contiguous seats as well as a bid price. In a like manner, event sponsors can specify quantities of contiguous seats along with the ask price. An event sponsor may wish to specify a minimum or maximum number of contiguous tickets to prevent large blocks of seats from being broken up or to force the sale of an exact number of seats in order to prevent a single seat in a block from being unsold (i.e., to prevent selling two seats of a block of three unsold seats). When a user's bid price and quantity of seats for an event equal a sponsor's ask price and is within the sponsor's minimum and maximum quantity of seats, a sale is made. Therefore, the main difference between an auction type format or a reverse auction-type format is that sales are made instantaneously when a bid price equals an ask price for a ticket.

Alternatively, for different classes of seating at the venue, a combination of sales formats can be implemented. For example, for a sporting event, seats which have the best view, such as box seats and luxury boxes, an event sponsor can implement a non-traditional format which seeks to secure the highest market price and implement a traditional format of ticket sales for the remaining seats. Also, tickets may be sold in the primary market by a particular method and sold in the secondary market by another method. Tickets may also be sold in the primary market by one method and sold in the secondary market by one of multiple available methods.

During the step of offering the ticket 126, a price is associated with the ticket. Depending on the format the price has a different significance. For example, the price may be a first bid price or, in an exchange type format, the price may be an ask price. Next bids are placed on the ticket 128 until the ticket is sold 130. If the ticket is sold the ticket is now owned by the new buyer 132 who may use the ticket and enter the event 136 or offer the ticket for resale 126. If the ticket remains unsold 138, the ticket may be used in the primary market 120. Additionally, unsolicited bids can be placed for a ticket. Anyone seeking to buy a ticket can specify the price at which he or she is willing to buy and wait to see if a ticket owner is willing to sell at that price.

Each time a ticket is transferred new ownership information is associated with the ticket. Ownership information could be credit card numbers used to purchase the ticket, a cell phone number, a digital encryption on a personal digital assistant, or a single- or multi-dimensional bar code. The two dimensional bar code can be printed by the user in order to provide a physical indication of ticket ownership. In order to provide an incentive for event sponsors to grant permission to sell the tickets in the secondary market, the present system provides that for sales in the secondary market the event sponsor will receive a royalty. Royalties can be a flat fee or a fee based on the sales price of the ticket in the secondary market.

Figure 5:
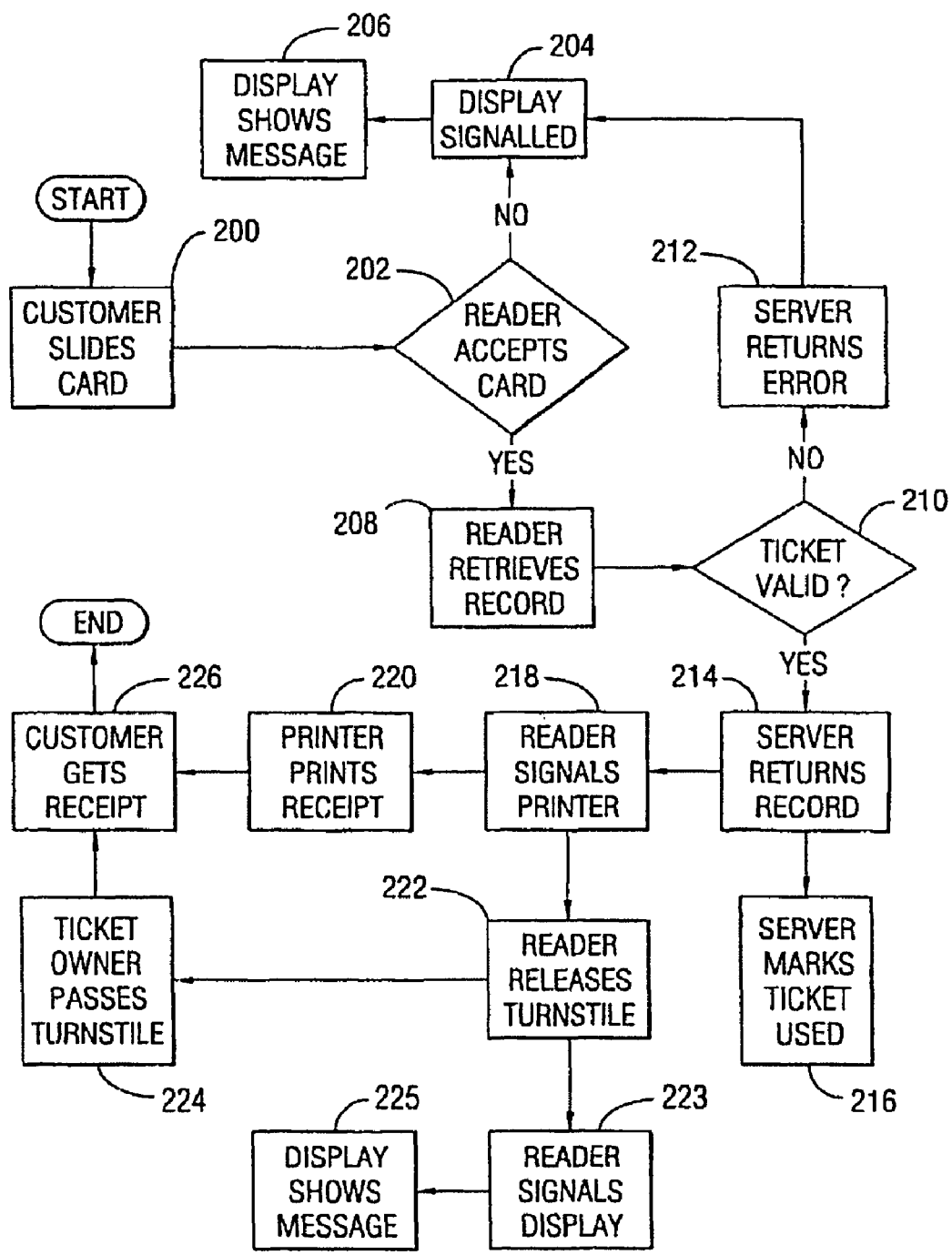
FIG. 5 is a flow chart describing the steps of an embodiment of the present invention.

Referring to FIG. 5, upon arriving at the venue to attend an event, the ticket owner authenticates himself to the event sponsor in order to gain entry to the venue. Authentication can occur in a variety of ways including infra-red wireless scanning. In one example, the ticket owner slides the credit card 200 associated with the ticket through the authentication reader 24 on a turnstile 18. Alternative methods for authentication could be implemented such as bar coded authentication tickets, as described above. If the authentication reader 24 unsuccessfully scans the authentication 202, the reader signals the display 204 to indicate that the authentication was not successfully scanned 206. If the authentication is successfully scanned the reader queries the venue database server 20 to determine whether the ticket is valid 210. If the ticket is not valid, the venue database server 20 returns an error 212 and the display is signaled 204 and message displayed 206. If the ticket is valid, the venue database server 20 returns a message indicating the ticket is valid 214.

Next, the venue database server 20 marks the ticket as used 216 within the database and signals the printer 26 to print a receipt 216 and the printer responds by printing a receipt 218. The authentication reader 24 also releases the turnstile 18 (step 222) and signals the display 223 which displays a message 225. Next, the ticket owner passes through the turnstile 224 to allow the ticket owner to enter the venue 4.

In order to implement the present system, user roles are implemented, such as: venue management, event management, event marketing, ticket owner, ticket buyer and administration. The roles may interact with the system in order to fulfill necessary tasks by either using terminals 6 connected via the Internet 8 or directly to the data center 2 or venue 4. A user fulfilling a venue management role can enter information regarding the venue such as seating charts, directions to the venue and entrance gate information. A user fulfilling an event management role can enter information about an event to take place at the venue, such as the name, time, date, seating configuration of the venue, ticket pricing for the event and merchandise to be offered to ticket purchasers. A user fulfilling an event marketing role can enter information pertaining to products and services that are offered to users upon offer or completion of a ticket sale. A user fulfilling the role of a ticket owner can enter information regarding the price (first auction bid or ask price, as appropriate) and identity of the ticket or tickets. A user fulfilling the role of ticket buyer can enter information regarding the quantity and price (an "auction bid" price or an "exchange bid," as appropriate). A user fulfilling the role of administrator preferably has the rights of all roles and any additional task necessary for maintenance of the system.

Figure 6:
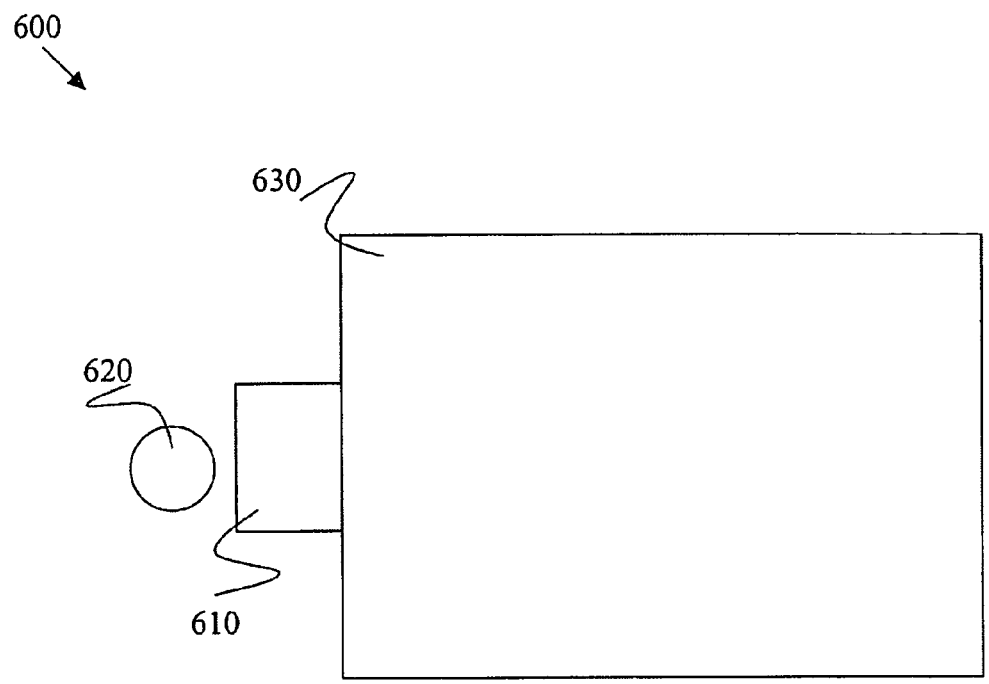
FIG. 6 shows an electronic ticketing and access system used in accordance with an embodiment of the present invention.

FIG. 6 shows an electronic ticketing and access system 600 used in accordance with an embodiment of the present invention. The electronic ticketing and access system 600 includes an access device 610. The access device allows a patron 620 to access a venue 630. The access device 610 may include a turnstile, such as the turnstile 18, an access gate, or other access device. The access device 610 may be a handheld access device, such as a handheld scanner, handheld barcode reader, or other handheld device. The access device 610 may be a wired and/or wireless access device. Alternatively, the access device 610 may communicate via infrared or other data transmission medium.

The access device 610 may be a standalone unit or may be one of a plurality of access devices 610. The plurality of access devices 610 may be networked. The one or more access device(s) 610 may communicate with a remote server or other data storage and/or processing system. The access device 610 may include a detector to detect data and a processor to process that data. In an embodiment, a plurality of access devices 610 may be grouped in rows, according to function. For example, one row of turnstiles may accommodate paper tickets while another row of turnstiles or scanners accommodates electronic identification or access cards.

The access device 610 verifies authentication data to allow a ticket owner 620 to access a venue 630. The access device 610 may accept a printed ticket, an access card, an identification card (such as a driver's license, state identification card, student ID, smart card, or membership card), a credit or debit card, a biometric identifier, a barcode, a magnetic strip, a wireless transmitter, a radio frequency identification device (RFID), an electronic key, or other such authentication/access data. The authentication data verifies that the bearer 620 is allowed to access the venue 630. The bearer 620 may not necessarily be the original purchaser of admission to the event. In an embodiment, the access device 610 is a multi-input access device. That is, the access device 610 is capable of accepting one or more of the above methods of access authentication, for example.

In an embodiment, an access device 610, such as a multi-input turnstile, accepts both paper and paperless tickets. A scanner or other detector on the access device 610 verifies the authentication data and allows access to the venue 630. A magnetic strip may be scanned to determine access, for example. A bar code may also be scanned to verify access. Alternatively, a picture or digitally encrypted facsimile of a ticket may be transmitted to the access device 610 and displayed on a screen of the device 610. A digital code may be sent to an interface on the access device 610 to allow entry. A wireless or infrared link may be used to transmit the digital code to a receiver at the access device 610. In another embodiment, a transmitter at the access device 610 may transmit a pulse to an RFID device, which returns a response to authenticate the bearer 620. Biometric data, such as a fingerprint, retinal scan, or voiceprint may also be used to authenticate an individual 620 seeking access to a venue 630. An electronic device, such as a handheld computer, personal digital assistant, cellular phone, or wireless transmitter may transmit a paperless ticket or access key to the access device 610 for entry into a venue 630.

Verification of an individual for admission to a venue may be accomplished in a variety of ways. Thus, certain embodiments provide an access device that allows verification using a plurality of techniques. As venues transition from paper tickets to paperless tickets, certain embodiments accommodate paper tickets while also accepting forms of paperless entry, such as an electronic ticket. That is, certain embodiments may allow admission through surrender of a tangible item and/or with requiring surrender of a tangible item. In an embodiment, verification of a patron's seat may be generated in paper and/or paperless form upon access to the venue.

Certain embodiments provide a venue with new access devices, such as new turnstiles to allow access to the venue. Other embodiments provide a retrofit module to modify existing access devices, such as turnstiles or scanners, to accept paperless tickets and authentication data. In an embodiment, a retrofit system allows a turnstile to communicate with an access computer system to allow admission to a venue using paperless and/or printed forms of authentication.

Figure 7:
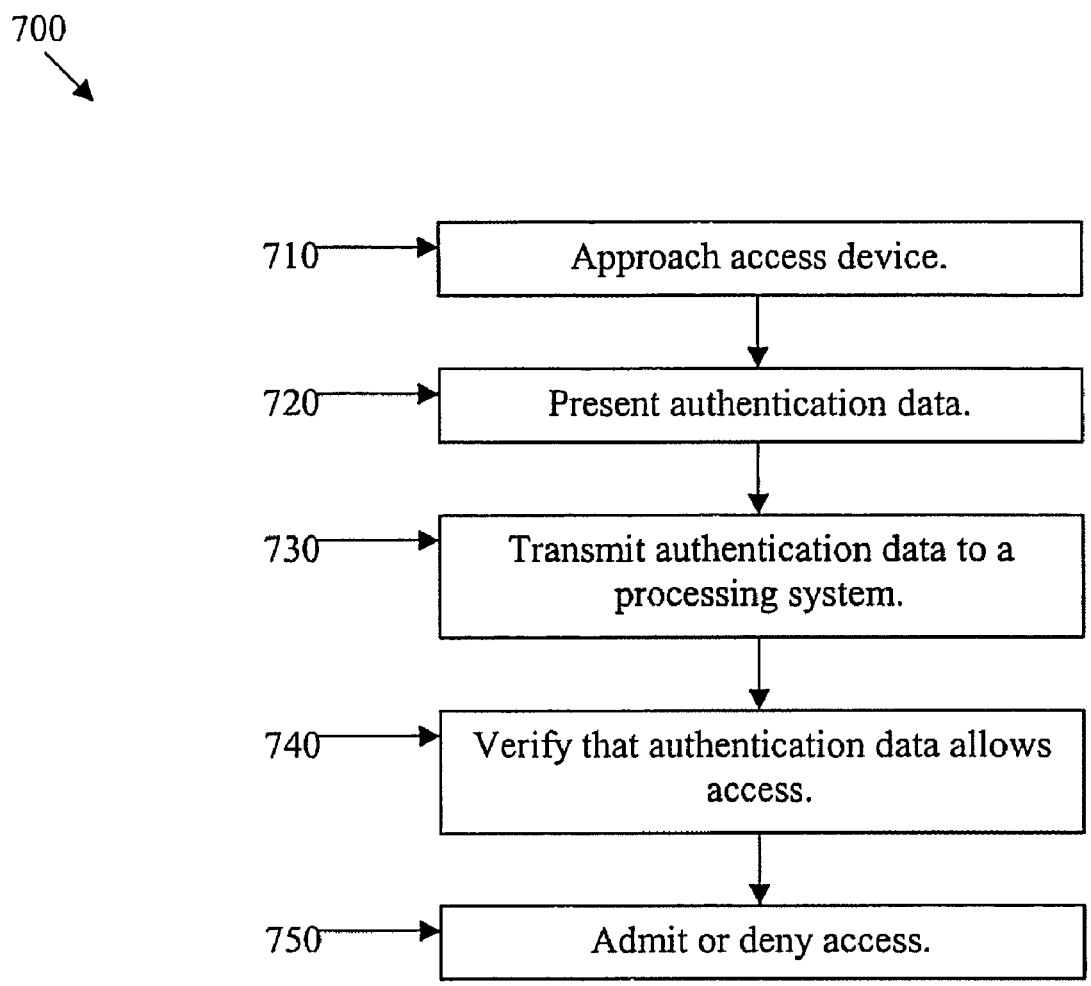
FIG. 7 illustrates a method for multi-input access to a venue used in accordance with an embodiment of the present invention.

FIG. 7 illustrates a method 700 for multi-input access to a venue used in accordance with an embodiment of the present invention. First, at step 710, a patron approaches an access device. Then, at step 720, the patron presents authentication data at the access device. The authentication data may be in the form of a paper ticket or may be paperless authentication data, such as a bar code, magnetic strip, biometric identifier, wireless transmitter, or other authentication data, for example. The patron may move to present the paper or paperless authentication data, or a detector at the access device may detect the authentication data on the patron.

Next, at step 730, the authentication data is transmitted to a processing system, such as a processor at the access device or a verification computer located remotely from the access device. At step 740, the processing system verifies that the authentication data allows the patron into the venue. For example, the processing system may compare the authentication data to entries a database. Then, at step 750, the patron is admitted or denied access to the venue based on a result returned by the processing system.

In an embodiment, before arriving at the venue, upon gaining access to the venue or after gaining access to the venue, a verification of the patron's access may be generated in paper and/or paperless form. In many venues or for many events, entrants to a venue must be able to produce verification of his or her particular seating location. Such verification or receipt may be used to confirm access to a certain section or tier in a venue or access to certain benefits or features of an event or venue, for example. The verification may be a printed receipt and/or a paperless verification of the patron's right of access. For example, paperless verification may be a bar code or magnetic encoding, a smart card, a wireless or infrared or other signal transmission, etc. In another embodiment, a patron's authentication may be entered into a database and verified via biometric identification, card identification, personal transmitter, encoded magnetic strip, and/or bar code, for example. In an embodiment, verification may be transmitted via email or facsimile to a patron prior to arrival at an event or venue, for example. The patron may then print the verification, for example.

The access verification/receipt may be generated by the access device, such as the turnstile. Additionally, the verification/receipt may be generated by a transmitter, printer, kiosk or station inside or outside the venue. The verification/receipt may be transmitted, printed and/or encoded as described above. In an embodiment, a verification generation module or receipt unit, such as a turnstile, computer, mobile device or standalone kiosk, for example, prints or uploads a receipt, ticket, or other access verification for a patron.

Thus, control may be maintained over a venue allowing paper-based and/or paperless tickets by providing a system for seating or access verification inside the venue. Through presentation of a paper receipt or paperless verification, an entrant's area or level of access may be confirmed by staff and/or electronic systems at the venue.

For example, the access device is a wireless handheld device, such as a personal digital assistant. Authentication data, such as a smart card, is used by a patron to gain access to a concert venue. Once inside the venue, the patron's smart code includes seat verification information. An usher or other staff member may use another handheld device, such as a wireless personal digital assistant, to scan the smart card to determine that the patron is allowed to sit in a certain section of the concert venue and/or a particular seat in the section.

Figure 8:
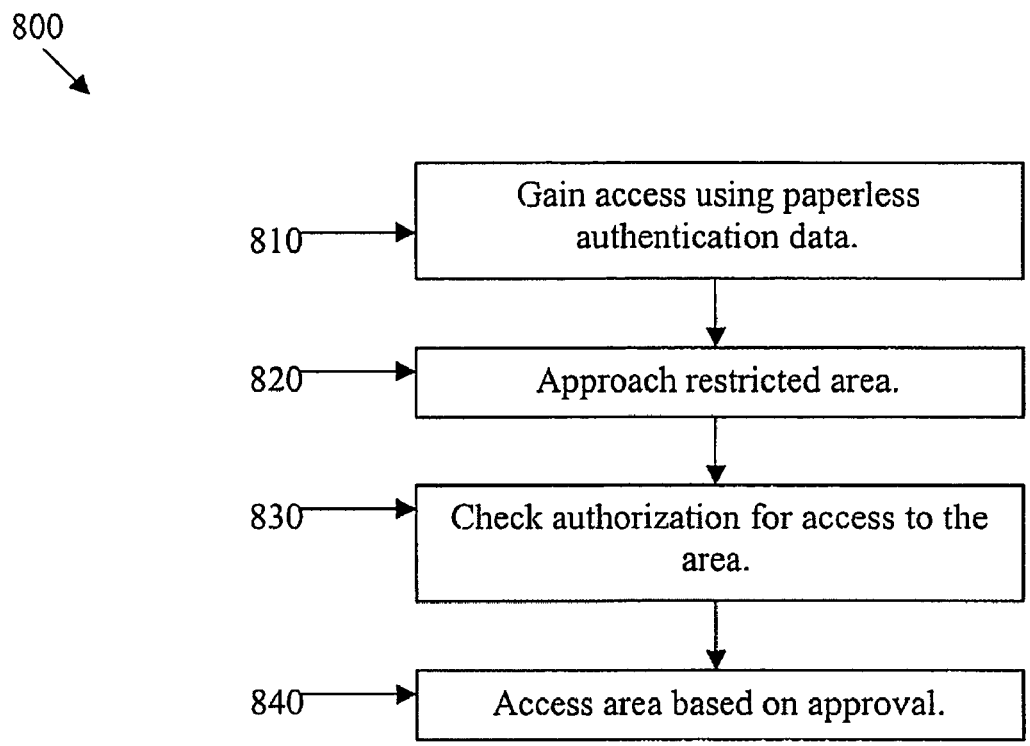
FIG. 8 illustrates a flow diagram for a method for access verification inside a venue in accordance with an embodiment of the present invention.

FIG. 8 illustrates a flow diagram for a method 800 for access verification inside a venue in accordance with an embodiment of the present invention. First, at step 810, a patron gains access to a venue using paperless authentication data. For example, a patron enters a stadium using that patron's credit card information. Then, at step 820, the patron approaches an area of the venue to which access has been restricted to a certain group of patrons. For example, a patron bearing a ticket to a lower tier of a stadium walks to the appropriate seating section after entering the stadium.

Next, at step 830, a staff member checks the patron's authorization for access to the area. For example, an usher with a handheld wireless device may scan the magnetic strip of the patron's credit card or otherwise verify that the patron is allowed to sit in the section of the stadium. That is, in order to regulate patron traffic and restrict access to certain areas, venue staff ensure that a patron is entitled to access a given area. Use of paperless seat verification eliminates the need for presentation of a paper ticket inside the venue. Alternatively, a paper ticket or seat verification may be generated at the venue, even if the patron used paperless authentication data to access the venue. Finally, at step 840, the patron accesses the area after approval by the staff member. Verification may be used to confirm access to a particular seat, a particular seating area, a particular event within the venue, and/or a particular service within the venue, for example.

Alternatively, an automated scanning system may check the patron's authorization and allow access. For example, a patron may have a transmitter, RFID device or other mobile device which broadcasts a signature when triggered by a scanner. A scanner at the venue verifies that the person bearing the signature is authorized to access the area and then allows the patron to proceed.

Thus, certain embodiments provide a system and method for paperless ticket exchange. Certain embodiments allow paperless authentication data, such as biometric data, credit card or identification data, or transmission data to be used to access a venue. Certain embodiments provide a multi-use access device which accepts physical and/or non-physical authentication data to allow a bearer into a venue. Certain embodiments allow a verification of access to be generated for a patron upon access to the venue. The verification may be used as a receipt and/or as verification of a right to access a particular feature and/or area at a venue.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed is:

1. An access system for allowing access to a venue, said access system comprising:
a processor configured to facilitate transfers of rights to access a venue, the rights being access rights and the transfers including sales and purchases of different ones of the access rights by different patrons, wherein for each one of the access rights said processor, per transfer of the one access right from a respective patron with current ownership of the one access right to a successive patron, associates current ownership information of the successive patron with the one access right and changes from (a) association of ownership information of the respective patron with the one access right to (b) association of ownership information of the successive patron with the one access right, and wherein the one access right for each transfer comprises the ownership information of the respective patron and the successive patron as one of: a credit card number, a debit card number and a cell phone number;
wherein the processor maintains a database storing information regarding the access rights to the venue, said stored information including the respective ownership information of the respective patrons and successive patrons currently with the access rights, and said processor continuing to update ownership information throughout lifecycle of the access rights to the venue;
an access device formed of a detector and a processing unit, the detector detecting authentication data provided by the successive patron at the venue, wherein the authentication data identifies the successive patron having the one access right to the venue and said authentication data comprises at least paperless data, said paperless data being electronic identification of the successive patron as an individual in the access system but originally configured in one other system unrelated to access of said venue, the paperless data being logically unchanged between the access system and the other system but being effectively repurposed so that at a same time of serving a purpose other than personal identification in the one other system unrelated to access of said venue, the paperless data electronically identifies the successive patron in the access system;
the processing unit being operatively coupled to the database, and the processing unit being responsive to the detector and authenticating the authentication data provided by the successive patron at the venue by verifying the provided authentication data with the ownership information stored in the database such that the access device allows said successive patron access to said venue based on said provided authentication data, wherein the access device is configured to accept a plurality of forms of said authentication data to allow access to said venue; and
said detector of the access device comprises at least one of a handheld device or a retrofit unit that modifies existing access devices of the venue to accept the authentication data.

2. The system of claim 1, wherein said access device comprises an access gate.

3. The system of claim 1, wherein said access device generates access verification for said patron.

4. The system of claim 1, wherein said access device grants access to said venue by verifying said authentication data with data in the database.

5. The system of claim 1, further comprising a transfer event for access to said venue from an owner to said patron using patron ownership information.

6. The system of claim 5, wherein said authentication data is based on said patron ownership information.

7. The system of claim 1, wherein the paperless data includes any of: a credit card number of the patron, a debit card number of the patron, and a cell phone number of the patron; and the purpose in the other system includes any of indicating a credit card account, indicating a debit card account, and indicating a cell phone account.

8. A method for accessing a venue using authentication data, said method comprising:

using a first processor configured to facilitate transfers of rights to access a venue, the rights being access rights and the transfers including granting different ones of the access rights to different patrons, wherein for each one of the access rights said first processor, per transfer of the one access right from a respective patron with current ownership of the one access right to a successive patron, associates current ownership information of the successive patron with the one access right and changes from (a) association of ownership information of the respective patron with the one access right to (b) association of ownership information of the successive patron with the one access right, and wherein the one access right for each transfer comprises the ownership information of the respective patron and the successive patron as one of: a credit card number, a debit card number, and a cell phone number;

using a second processor, maintaining a database that stores information regarding the access rights to the venue, said stored information including the respective ownership information of the respective patrons and successive patrons currently with the access rights and said second processor continuing to update ownership information throughout lifecycle of the access rights to the venue;

using a third processor, associating paperless authentication data with authorization for the successive patron to access said venue, said paperless authentication data being electronic identification of the successive patron in a venue access system but originally configured in one other system unrelated to access of said venue, the paperless data being logically unchanged between the access system and the other system but being effectively repurposed so that the paperless authentication data is useable in common by other systems unrelated to access of said venue;

said third processor, verifying that the successive patron has the one access right to the venue by comparing the paperless authentication data with the ownership information stored in the database; and said third processor, authorizing access to said venue based on said paperless authentication data, wherein said authorizing of access includes utilizing an access device that comprises at least one of a handheld device or a retrofit unit that modifies existing access devices of the venue to accept the paperless authentication data and the paperless authentication data includes a plurality of forms.

9. The method of claim 8, wherein the access device further accepts printed authentication data and non-printed authentication data.

10. The method of claim 8, wherein said authorizing step further comprises authorizing access to said venue by verifying said paperless authentication data with data in the database.

11. The method of claim 8, further comprising transmitting said paperless authentication data to a processing system for verification of the one access right by said patron.

12. The method of claim 8, further comprising generating access verification for said patron at said venue.

13. The method of claim 8, further comprising transferring a right to access said venue from a prior owner to said patron.

14. The method of claim 8, wherein said authorizing step further comprises authorizing access to said venue based on said paperless authentication data using an access device capable of accepting multiple forms of paper and paperless authentication data.

15. The method of claim 8, wherein the paperless authentication data includes any of: a credit card number of the patron, a debit card number of the patron, and a cell phone number of the patron; and the other systems include any of: a credit card system, a debit card system, and a cell phone system.

16. A multi-input access device allowing access to an event, said access device comprising:

given a venue access system having a first processor configured to facilitate transfers of access rights to an event, the transfers including sales and purchases of different ones of the access rights by different people, wherein for each one of the access rights said first processor, per transfer of the one access right from a respective person with current ownership of the one access right to a successive person, associates ownership information of the successive person with the one access right and changes from (a) association of ownership information of the respective person with the one access right to (b) association of ownership information of the successive person with the one access right, and wherein the one access right for each transfer comprises the ownership information of the respective patron and the successive patron as one of: a credit card number, a debit card number, and a cell phone number;

wherein the first processor maintains a database storing information regarding the access rights to the event, said stored information including the respective ownership information of the respective people and successive people currently with the access rights, and said processor continuing to update ownership information throughout lifecycle of the access rights to the event;

a detector for detecting authentication data for the successive person at a venue of the event, wherein said authentication data comprises at least paperless authentication data that is electronic identification of said successive person useable in common by other systems unrelated to access of said venue, and the detector accepts a plurality of forms of said authentication data to allow access to said event;

the paperless authentication data being electronic identification of the successive person in the venue access system and being originally configured in one other system unrelated to access of said venue, the paperless data being logically unchanged between the access system and the other system but being effectively repurposed so that the paperless authentication data is useable in common by other systems unrelated to venue access; and a second processor operatively coupled to the detector and the database for authenticating said authentication data by verifying the authentication data with the ownership information stored in the database and determining whether said successive person is allowed to access said event, wherein one of the detector or the second processor is coupled to at least one of a handheld device or a retrofit unit that modifies existing access devices of the venue to accept the authentication data.

17. The access device of claim 16, wherein the plurality of forms of said authentication data comprises at least one of a printed ticket, a magnetic strip, a bar code, a credit card, an identification card, a smart card, a radio frequency identifier, a mobile device, a wireless device, a signal, an electronic device, and biometric data wherein the paperless authentication data includes any of a credit card number, a debit card number, and a cell phone number; and the other systems include any of a credit card system, a debit card system, and a cell phone system.

18. The access device of claim 16, further comprising a verification module generating access verification data for said person.

* * * * *